(12) United States Patent
Kroll

(10) Patent No.: US 7,444,154 B2
(45) Date of Patent: Oct. 28, 2008

(54) NUISANCE CELL PHONE LOCATOR

(75) Inventor: Mark W. Kroll, Simi Valley, CA (US)

(73) Assignee: Kroll Family Trust, Crystal Bay, MN (US)

( * ) Notice: Subject to any disclaimer, the term of this patent is extended or adjusted under 35 U.S.C. 154(b) by 1011 days.

(21) Appl. No.: 10/414,733

(22) Filed: Apr. 15, 2003

(65) Prior Publication Data

US 2004/0018845 A1    Jan. 29, 2004

Related U.S. Application Data

(63) Continuation-in-part of application No. 09/406,067, filed on Sep. 24, 1999, now Pat. No. 6,580,915.

(51) Int. Cl.
*H04Q 7/20* (2006.01)
(52) U.S. Cl. .................. 455/456.1; 455/279.1
(58) Field of Classification Search ................ 455/456, 455/431, 67.1, 67.3, 279.1, 278.1, 296, 304
See application file for complete search history.

(56) References Cited

U.S. PATENT DOCUMENTS

| | | | |
|---|---|---|---|
| 3,800,231 A * | 3/1974 | Pratt | 455/265 |
| 5,444,762 A | 8/1995 | Frey et al. | |
| 5,512,908 A | 4/1996 | Herrick | |
| 5,625,364 A | 4/1997 | Herrick et al. | |
| 5,670,742 A | 9/1997 | Jones | |
| 5,678,200 A | 10/1997 | Levi | |
| 5,684,861 A | 11/1997 | Lewis et al. | |
| 5,856,803 A | 1/1999 | Pevler | |
| 5,873,040 A | 2/1999 | Dunn | |
| 5,877,630 A | 3/1999 | Kraz | |
| 6,148,219 A * | 11/2000 | Engelbrecht et al. | 455/456.2 |
| 6,212,392 B1 | 4/2001 | Fitch et al. | |
| 6,233,459 B1 * | 5/2001 | Sullivan et al. | 455/456.2 |
| 6,321,092 B1 | 11/2001 | Fitch et al. | |
| 6,456,822 B1 | 9/2002 | Gofman et al. | |
| 2001/0053698 A1 * | 12/2001 | Karmi et al. | 455/456 |

\* cited by examiner

*Primary Examiner*—Creighton H Smith
(74) *Attorney, Agent, or Firm*—Vidas, Arrett & Steinkraus

(57) ABSTRACT

This invention covers the use of multiple internal antennas to locate a nuisance cell phone which is being inappropriately operated. For a largely 1-dimensional layout like an airplane, an embodiment teaches the location being done by using differential timing teaches the use of either differential timing or a bearing angle technique. For a largely 2-dimensional layout, such as a theater, the invention uses either differential timing or a bearing angle approach.

11 Claims, 12 Drawing Sheets

NUISANCE CELL PHONE LOCATOR

This application is a Continuation-in-part of "Aircraft Internal EMI Detection and Location" Serial No. 09/406,067 filed on Sep. 24, 1999 now U.S. Pat. No. 6,580,915.

BACKGROUND OF THE INVENTION

Hand-held cellular phones have caused significant interference with navigation systems in commercial aircraft. While the power level on a cellular phone may be adjusted down to as low as six milliwatts for perfect connections, the power output can rise to as much as 2 watts. A hazard nearly as important in preventing that of interference with aircraft navigation is the potential paralysis of the ground-base cellular system. The ground-base cellular system is designed for people driving or moving slowly on the ground and assumes that each user is only able to communicate with a handful of antennas. These antenna locations then agree which one has the strongest signal from the user and then carry the communication. An individual in an aircraft flying over a city could literally tie up one channel each in over a hundred antennas and this could cause a great deal of inefficiency and near paralysis in the ground cellular system. For this reason, and for the concern about aircraft navigation, it is a violation of federal law to use a cell phone in an aircraft.

Nevertheless, our society has grown so accustomed to the use of the cellular phones that aircraft passengers frequently use them illegally in flight. The rules on the ground have been relaxed to the point now that most airlines will allow the use of the cellular phone until the aircraft doors are actually closed. Many passengers assume that this indicates that the rules are just another bit of bureaucracy and are beginning to ignore them in flight with potentially disastrous consequences. Importantly, many passengers simply forget to turn their phones off when they board the plane.

Unfortunately, in spite of the hazard to the aircraft safety and ground communication systems, no commercial aircraft at present have a system for detecting the cellular phone usage and no one has taught a system for locating the cellular phone in the aircraft. If a cellular phone transmission could be detected, it is still now impossible to decide which of 200-400 passengers is using the phone—especially when one is using one of the hand-free earpieces which are essentially invisible or look like a radio earpiece.

What is needed is a system for detecting the use of a cellular phone during any time in a flight and immediately giving a location so the crew can take measures to have the cellular phone turned off.

In addition, a means is necessary for locating laptop computers, which are "noisy" emitters. Some laptop computers, typically due to modifications and peripherals, can emit significant levels of broad band electromagnetic interference (EMI).

There are many patents teaching various methods of locating a cellular phone. Representative are U.S. Pat. No. 5,512,908 of Herrick, "Apparatus and method for locating cellular telephones," and Dunn (U.S. Pat. No. 5,873,040), "Wireless 911 emergency location." All of the location techniques have a common goal of locating an emergency call from a cellular phone and are designed to give a location within several hundred feet. These inventions would clearly not be useful in an aircraft as the total dimensions of a plane are within this limit of resolution.

Other similar patents such as Herrick (U.S. Pat. No. 5,625,364), "Apparatus and method for finding a signal emission source" are doubly inappropriate for use in an aircraft, as they require moving the antenna to use phase changes to triangulate to the source.

A very interesting patent is Jones (U.S. Pat. No. 5,670,742); "EMI protected aircraft." Jones teaches the use of shielding in the aircraft windows to prevent cellular phone users from using them on the planes. One could imagine that the cost of treating aircraft windows might be cost-prohibitive.

Kratz (U.S. Pat. No. 5,877,630), "System and method for protecting an electronic device from electromagnetic radiation interference" teaches placing a detector inside sensitive circuitry. If the detector detects interfering radiation then it runs a test on the potentially effected circuitry to see if it was affected.

Lewis (U.S. Pat. No. 5,684,861), "Apparatus and method for monitoring cellular telephone usage." This is essentially a usage meter that would be tacked on to a rental cellular phone. The meter runs when its circuitry detects cellular phone transmission.

The system of Levi (U.S. Pat. No. 5,678,200), "Independent wideband RF transmission detector for cellular telephone," teaches a detector in a car which would shut off the stereo system when someone is using their hand-held cellular phone to make it easier to listen.

The invention of Pevler (U.S. Pat. No. 5,856,803), "Method and apparatus for detecting radio-frequency weapon use," teaches a military defense system which continuously looks for the spectral signatures of intentional radio frequency interference. At the end of the specification Pevler mentions radio frequency interference detecting and cellular phone number recording it. He does not say what to do with the number, how one would use it for prosecution, how one would identify the offending passenger, or how one would locate the offending passenger.

Frey (U.S. Pat. No. 5,444,762), "Method and apparatus for reducing interference among cellular telephone signals," teaches the use of an air cellular system which allows transmissions from the aircraft but is careful to use unused channels and is also careful to beam the signal in such a way that it will not interfere with ground base cellular systems.

Thus in spite of an obvious need, no one has taught any system for locating and identifying a cellular phone transmission within an aircraft.

Similarly, there has been taught no system of identifying operating cell phones in public places such as theaters. Fitch (U.S. Pat. Nos. 6,212,392 and 6,321,092) and Dunn (U.S. Pat. No. 5,873,040) teach methods of locating "cooperative" cell phones for emergency rescue. But, these methods are designed only to locate to a broad region of the outdoors. These methods must rely on the existing outdoors cell phone antenna system. They would be stretched to locate even to a large building and incapable of identifying an small region of a theater to say nothing of an individual seat.

SUMMARY OF THE INVENTION

One object of this invention is the use of multiple internal antennas to locate a nuisance cell phone which is being inappropriately operated. For a largely one dimensional layout like an airplane, an embodiment teaches the location being done by using differential timing. For a largely two dimensional area such as a stadium or theater the invention teaches the use of either differential timing or a bearing angle technique.

DETAILED DESCRIPTION OF THE DRAWINGS AND PREFERRED EMBODIMENT

Figure 1:
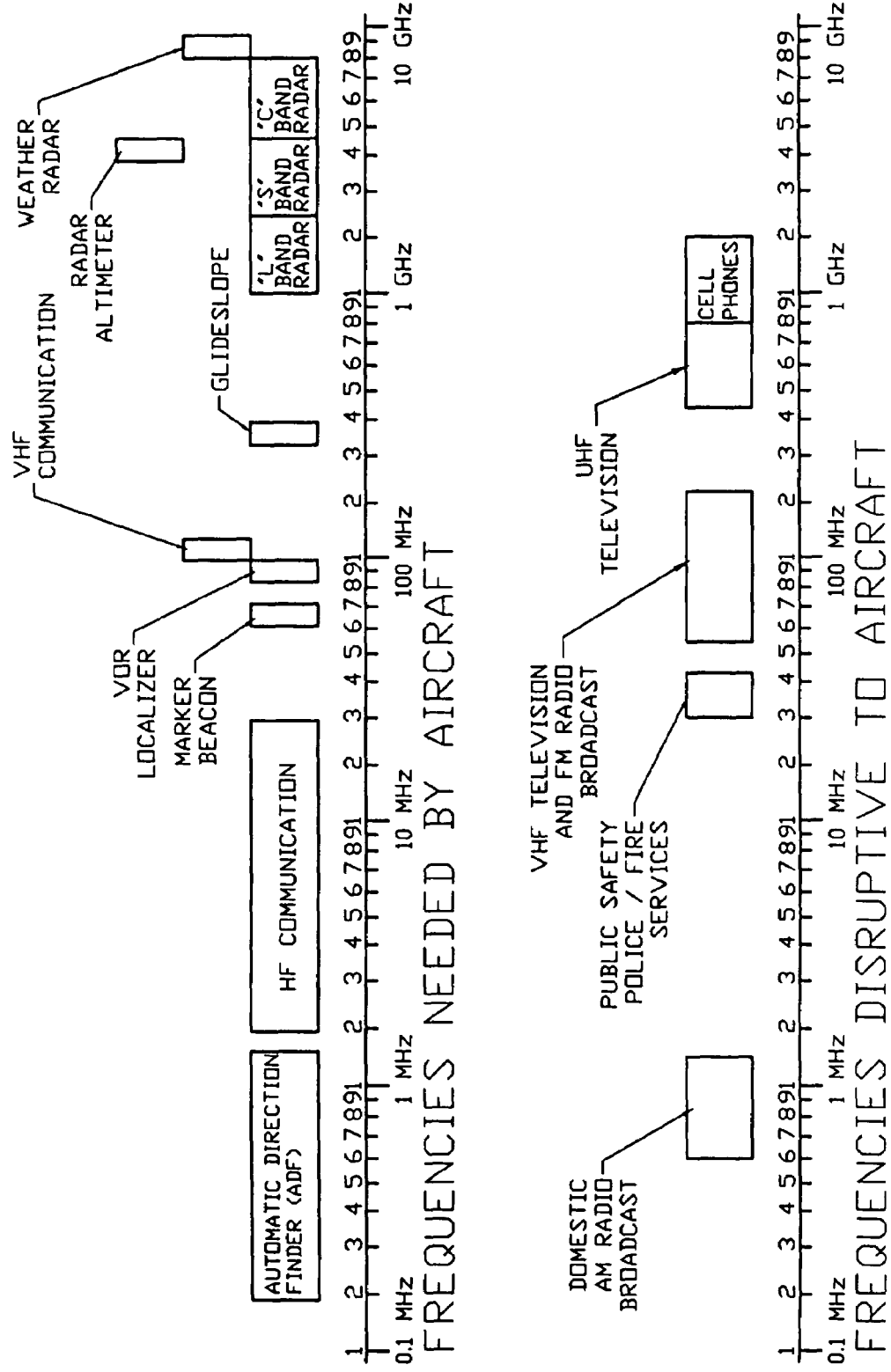
FIG. 1 Shows the typical frequencies of aircraft electronics (avionics) and potential interfering offenders.

FIG. 1 shows the basic frequencies used in communication systems for cellular phones and the frequencies used for aircraft communication and navigation systems. It can be seen that there are many opportunities for interference.

Figure 2:
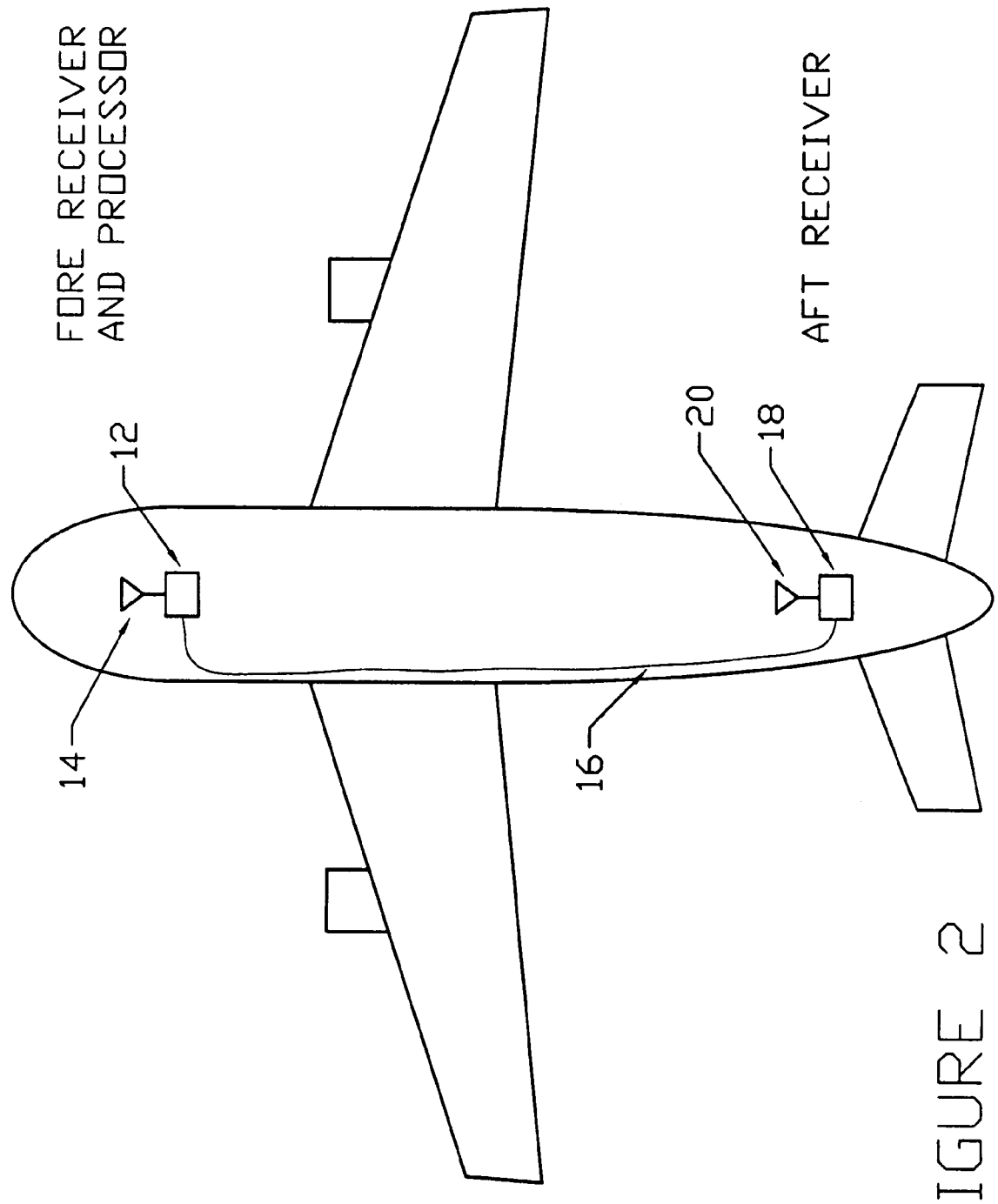
FIG. 2 Shows the basic schematics of the system in an aircraft.

FIG. 2 shows the basic schematic of the system in an aircraft. The aircraft 10 has a receiver in the fore (front) of the aircraft 12 and processor system connected to antenna 14. The aft (back) receiver 18 is connected to antenna 20 and transmits its signal through a high-speed cable 16 to the fore receiver and processor for location processing.

Figure 3:
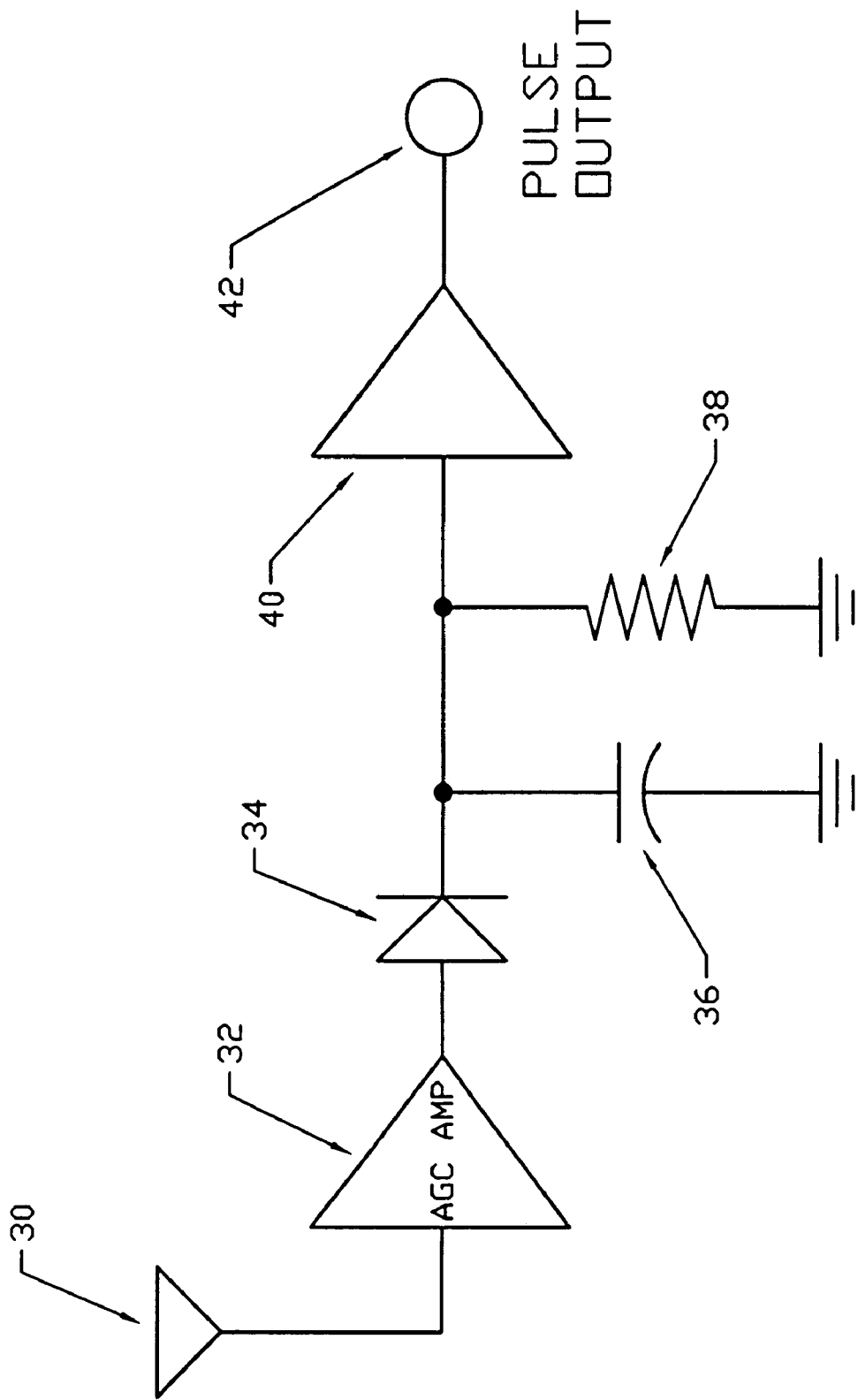
FIG. 3 Shows the basic schematics of the receiver for the system.

The basic analog system is shown in the receiver shown in FIG. 3. Here antenna 30 transmits the radio frequency signal to amplifier 32, which increases the gain to give a signal of at least 1 volt amplitude output. That signal is rectified by diode 34 and demodulated with a combination of diode 34 and capacitor 36 and resistor 38. That demodulated signal is then amplified by amplifier 40 and delivered as a pulse output on node 42.

Figure 4A:
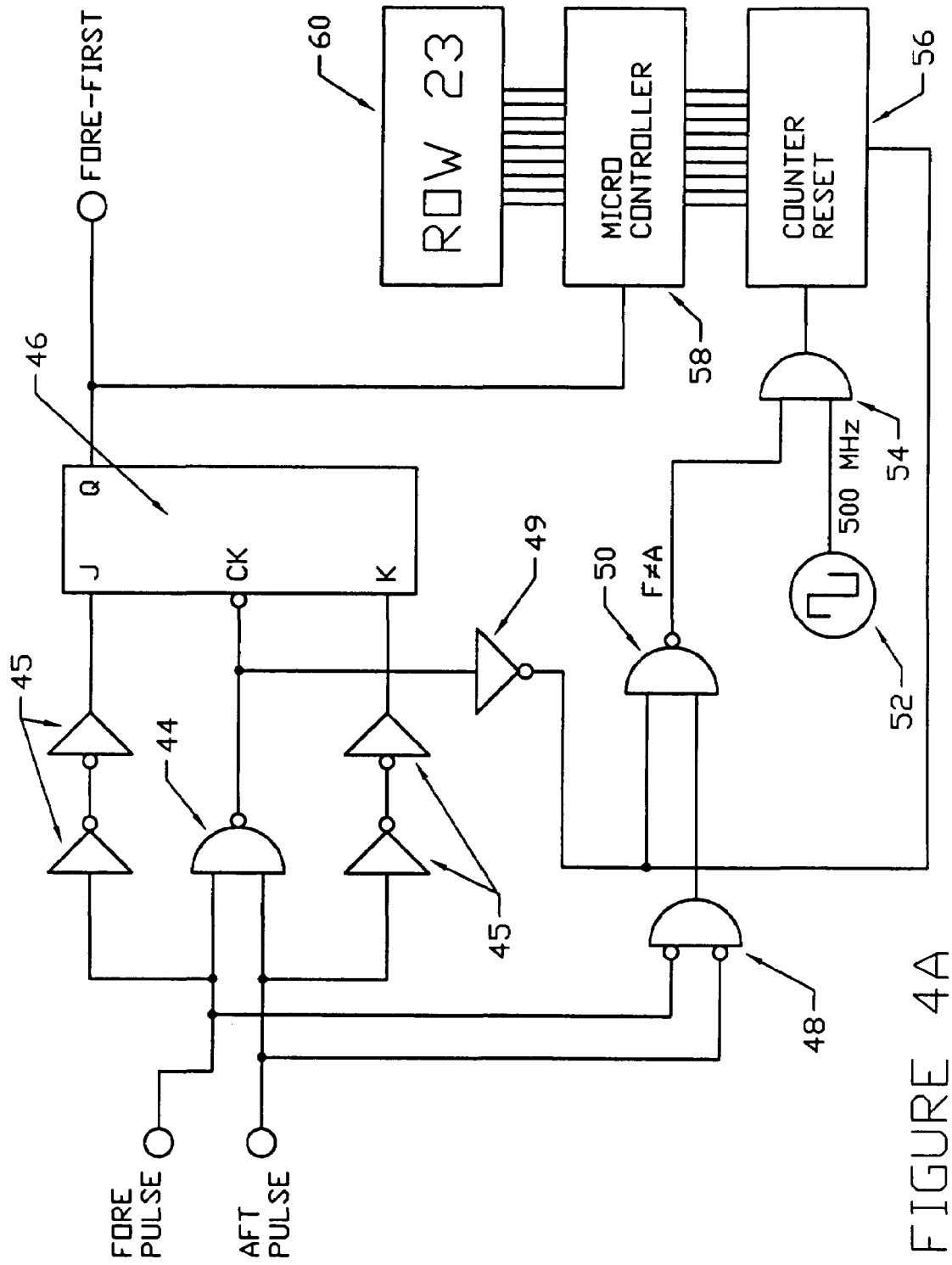
FIG. 4 Shows the basic schematics of the digital circuitry of the system.
Figure 4B:
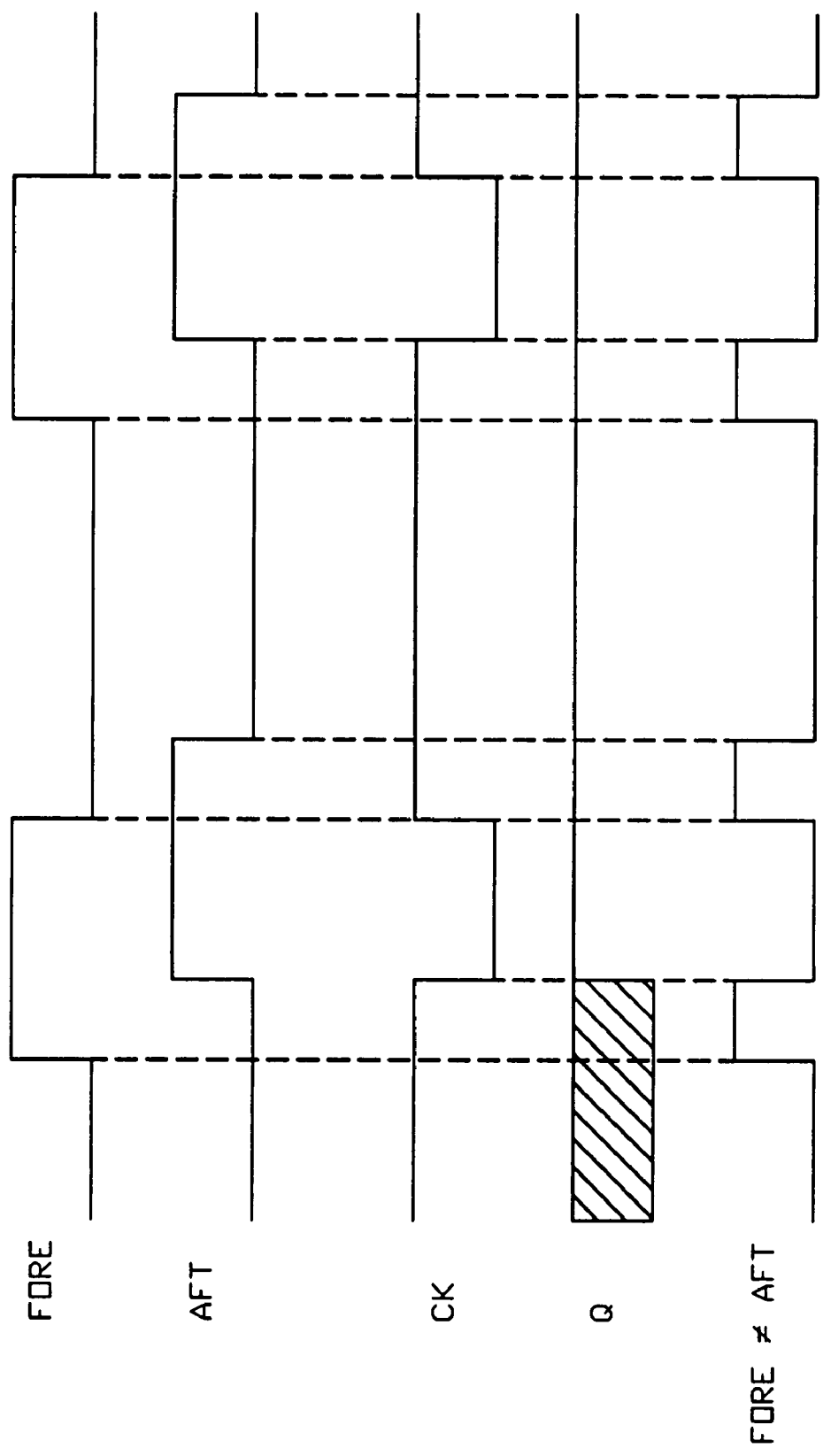

That pulse output is fed to the digital subsystem shown in FIG. 4a. That basic strategy is to see whether the fore pulse or aft pulse comes first with high precision in order to locate the row that the offending cellular phone is in. This is done with a digital circuitry shown in FIG. 4a. The fore pulse and aft pulse feed nor gate 44 and the fore pulse and aft pulse come into nand gate 44 so that when both pulses are high a low clock signal is generated. The fore pulse and aft pulse are also delayed through inverters 45 so that they will appear at the J and K inputs of flip-flop 46 slightly after the clock pulse appears. As seen in FIG. 4b this results in a Q output of the flip-flop 46 being high when the fore pulse arrives first. This is the key for the circuit's ability to recognize which antenna the cellular phone is closest to. Since electromagnetic waves travel at approximately one foot per nanosecond this information can be used to calculate the relative distance from the cellular phone to aircraft antennas. The fore and aft signals also go into negative input nand gate 48 and then join into the nor gate 50 with the inverted clock signal through inverter 49. This generates a signal fore-not-equal-to-aft which means that the one antenna has received a cellular phone pulse but the other antenna has not yet received it. That fore-not-equal-to-aft signal is anded with a 500 MHz oscillator 52 through nand gate 54. This signal is fed into counter 56. This counter is reset with every pulse out of the inverted clock line from inverter 49 to continuously measure the difference in arrival time between the two antennas. The calculation is very straightforward. If the fore pulse arrives six clock signals before the aft pulse that means that it arrives 12 nanoseconds earlier. That meant that the cellular phone is 12 feet closer to the fore antenna than it is the aft antenna. That means that the cellular phone is about six feet in front of the center of the aircraft. In this case, the center of the aircraft is defined as the midpoint between the fore and aft detection antennas. A resolution of one or two feet is certainly sufficient to locate the row of the offending cellular phone. The output of the counter is then fed to micro controller 58 which calculates the location in feet from the center of the plane then calculates, based on its data base of seat positions, the exact row the cellular phone is located in. This is displayed in display 60.

Figure 5:
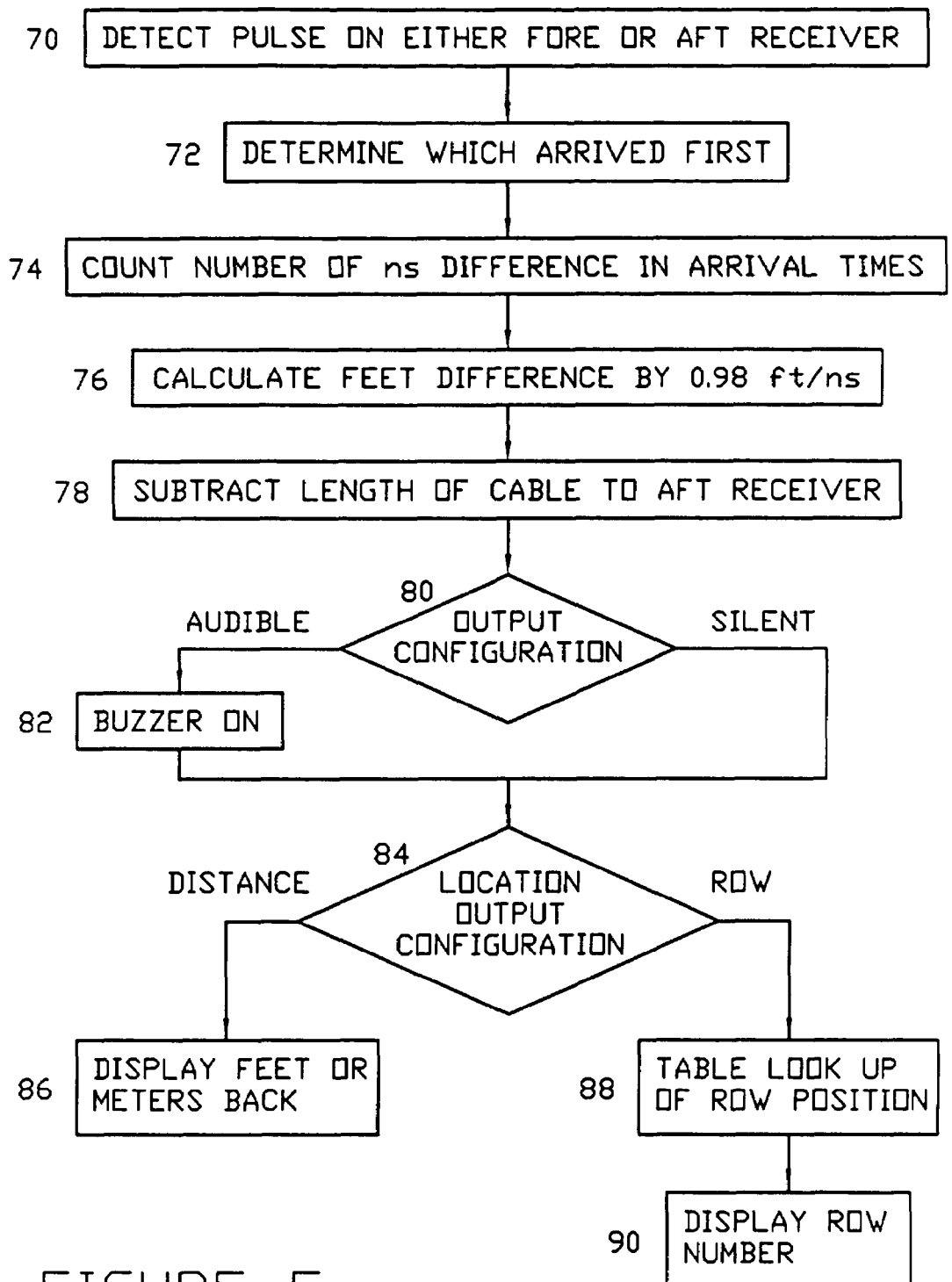
FIG. 5 Shows the basic method of the invention.

The method of the embodiment of this invention is shown in FIG. 5. In step 70 the system detects a pulse on either the fore or aft receiver and then in step 72 determines which arrives first. In step 74 the system counts the number of nanoseconds difference in arrival times.

In step 76 the feet difference is calculated by the division of 0.98 feet per nanosecond. In step 78 the system will subtract the length of the cable to the aft receiver. This is an important correction in that the signal from the aft receiver will always appear at least "100 feet" or 100 nanoseconds later than the fore receiver since the aft pulse must travel up the cable. This is a simple subtraction that can be performed by the micro controller shown as circuit 58 in FIG. 4a.

The system then looks at the output configuration in decision step 80. If the system is set up for silent operation then it goes on to step 84. If it is set up for audible operation then it will trigger a buzzer in step 82 to alert the flight attendants that there is a cell phone in use in the aircraft.

In step 84 the decision is made as far as the location output configuration. If distance was set then the system goes to step 86 and will display the distance in feet or meters from the back of the plane or from any other desired landmark. If row location was selected in step 88 then the system will look up row positions and then in step 90 display the exact row number.

Figure 6:
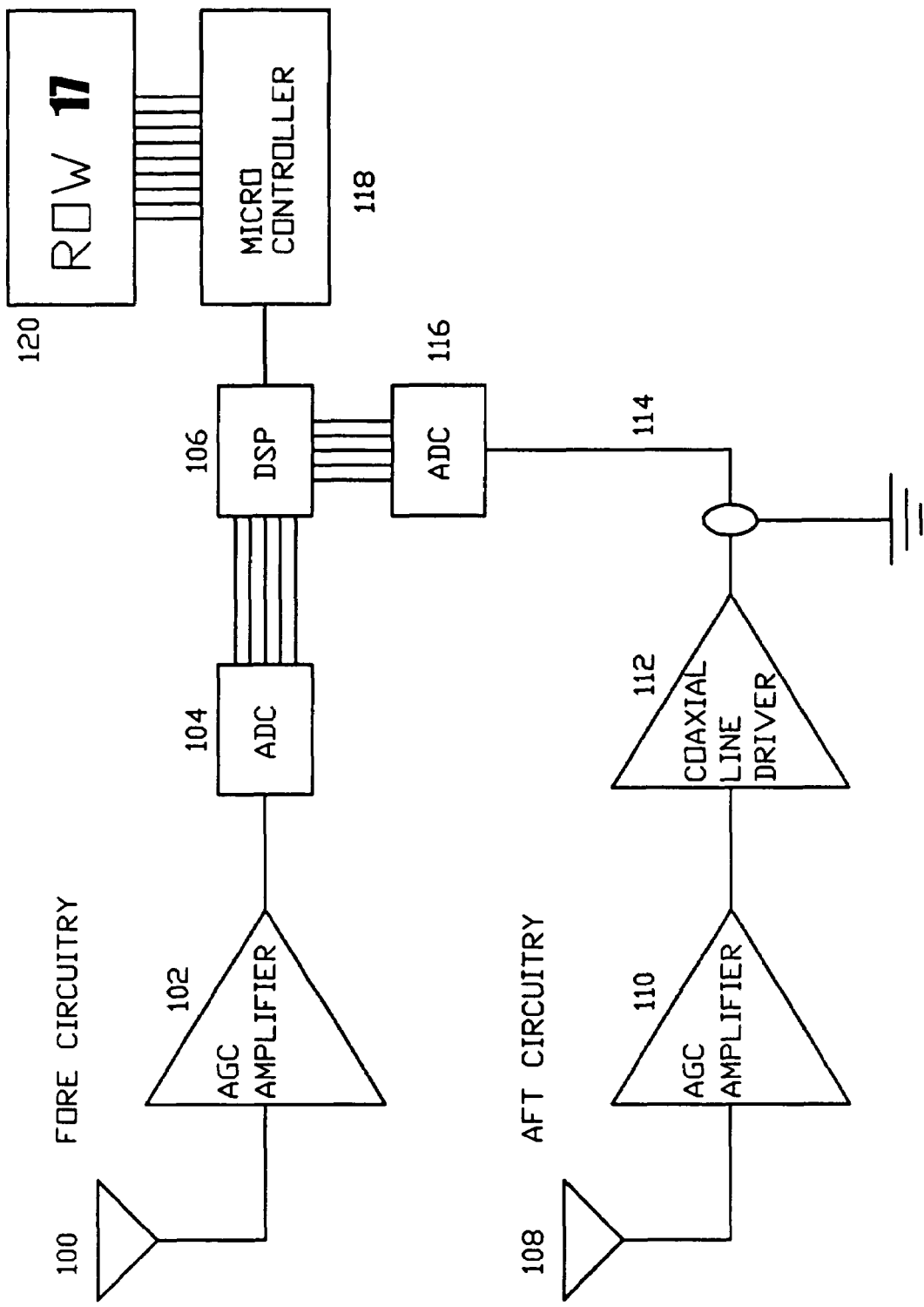
FIG. 6 Shows the basic circuitry for the laptop computer detection embodiment of the invention.

FIG. 6 shows a continuous correlation scheme that would be necessary for use with detection of laptop computer broad band emissions. Since cellular phones operate on a pulse train they are easily located with the circuit in FIG. 4a. For example the pulses shown in FIG. 4b for a United States digital system such as IS-54-b would show a pulse of 33.3% duty cycle as three users could be on a single channel. Some more modern systems such as the New American IS-95-a and the European GSM standard transmit with a 12.5% duty cycle. Thus the pulse would be high ⅛th of the time.

Unfortunately the simple scheme of FIGS. 4a and 4b will not work for the continuous broad band noise of the laptop like it would for the digitally pulsed cellular phone in FIG. 6 shows the fore antenna 100 feeding an AGC (automatic gain control) to amplifier 102 which then feeds into an analog to digital converter in box 104. That is then fed into a digital signal process (DSP) circuit which will process that information along with that from the aft circuitry.

The aft circuitry involves an antenna 108 feeding into an AGC amplifier 110 which then feeds into a coaxial line driver 112 that drives the high frequency signal down the coaxial cable 114 up to the ADC in the fore system 116. Those two now digital signals are mixed in the DSP 106 for a calculation of arrival time difference through a correlation analysis. That is then passed on to the micro controller 118 to locate the offending broad band signal source which typically will be a laptop computer. That is then passed to the display 120 to show the row location of the offender.

Figure 7:
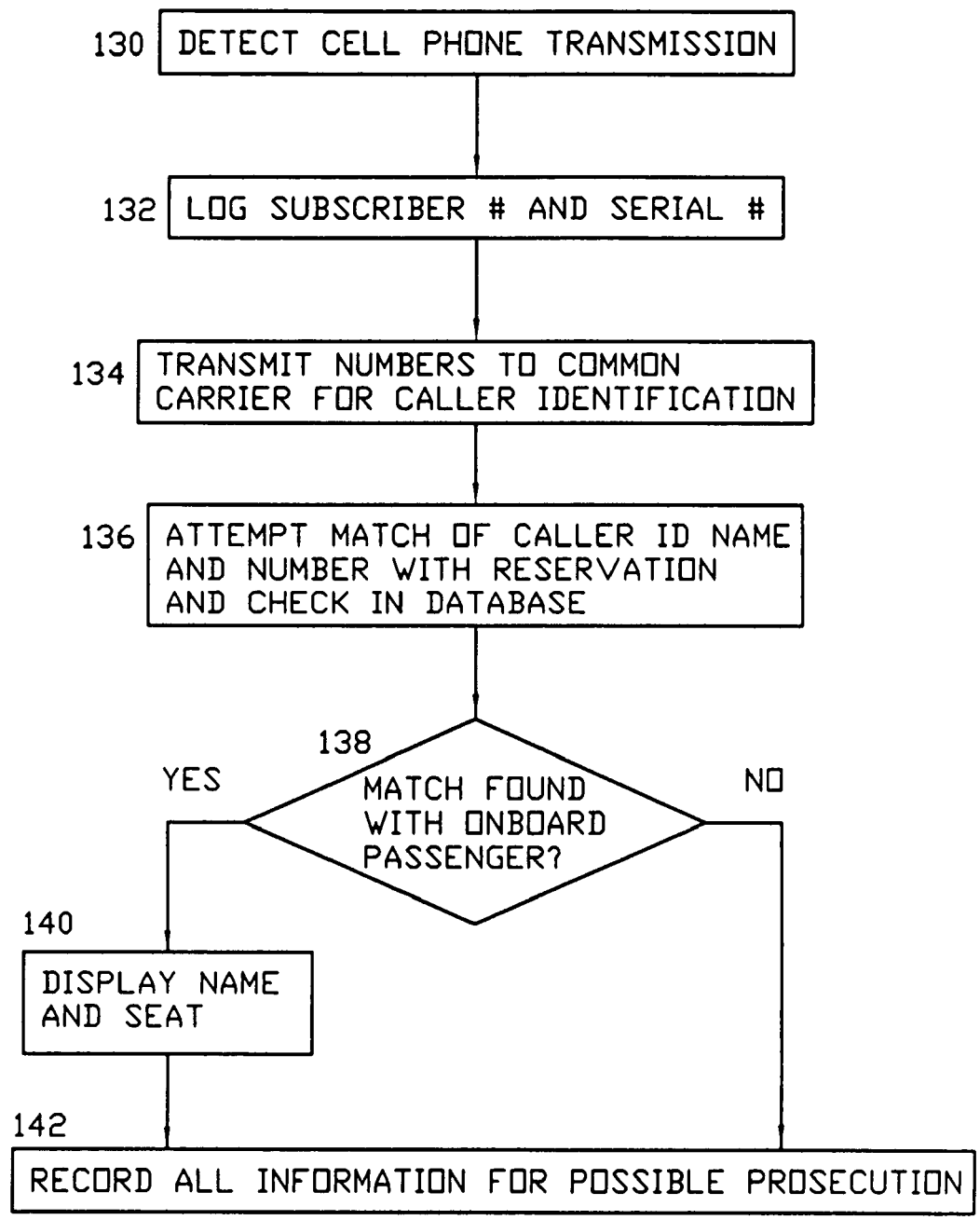
FIG. 7 Shows the flow chart for the embodiment of the invention using data base matches to identify the offending user.

FIG. 7 shows the method of an alternative and adjunctive embodiment for this invention. Step 130 of the system will detect a cellular phone transmission. In step 132 it will log the subscriber and serial number. In step 134 those numbers will be transmitted down to the ground to a common carrier for a caller identification attempt.

In step 136 an airline system will attempt to match the caller id with a name and number with a reservation and check-in database. At decision 138 the system will see if it was able to make a plausible match with an on-board passenger. If the answer is "no" then the method just goes on to step 142 to record information for a possible later prosecution. If a match is found in step 138 then it goes on to step 140 to display the name and the seat location of the passenger to the flight attendants for immediate interaction.

A final embodiment involves the addition of a signal strength meter on the output of amplifier FIG. 3. This could be easily made in a small battery operated hand-held system and a flight attendant could carry this down the aisle either openly or surreptitiously to get the strongest signal to identify the offending passenger.

Figure 8:
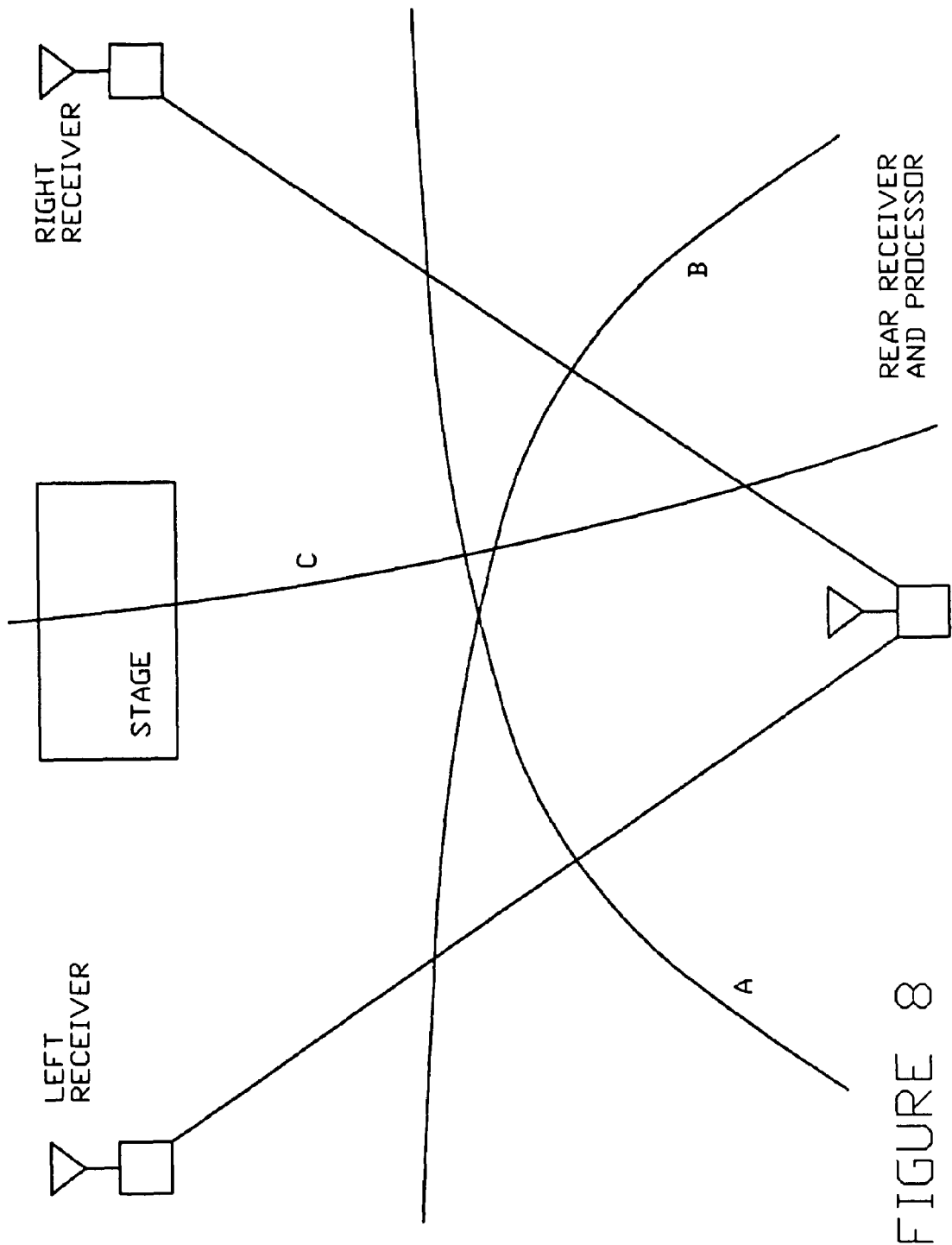
FIG. 8 Shows the method of using arrival times in a theater.

FIG. 8 shows the use of the invention to locate a cellular phone in a theatre. Cell phone calls in audiences are a highly irritating nuisance and should be detected before a performance begins. Because the universe of locations is now two dimensional (instead of one for airplanes) the system uses three receivers. The time of arrival differences give hyperbolas for potential location loci. For example, when the Rear Receiver 130 receives the cell phone signal before the Left Receiver 132, then the phone will be found on a hyperbola such as that depicted by curve A. Similarly the Right Receiver 134 generates curves B and C in concert with the other two receivers. The intersection of curves A, B, and C gives an accurate location of the offending cell phone.

Figure 9:
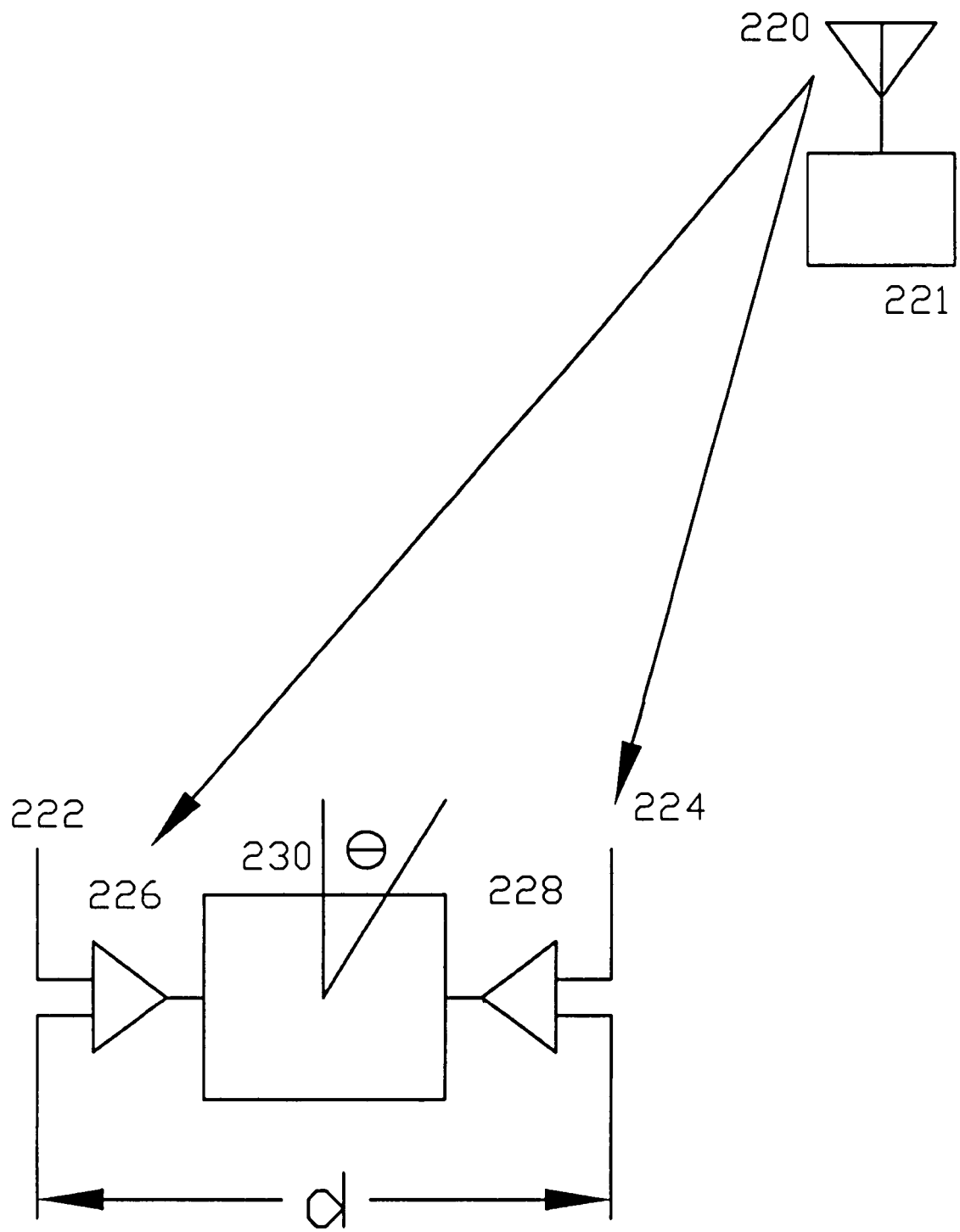
FIG. 9 Shows the schematic of the bearing angle calculation system.

FIG. 9 shows another embodiment of the invention. The cell phone 221 transmits a signal out of its antenna 220 along the vectors shown to a first locator unit. These are received by the left dipole antenna 222 and right dipole antenna 224. The signals are fed, respectively, through high frequency amplifiers 226 and 228 to the main circuitry 230. The spacing d is ideally about 8 cm to allow the antenna to fit into a small unobtrusive unit. However, spacings from 4 cm out to 200 cm would function adequately.

The primary frequencies for cell phones transmission (the base stations use different frequencies) include the 824-849 MHz (for the USA AMPS system) and approximately 1.8 GHz and 1.9 GHz for other systems. High frequency amplifiers are available from a number of sources including Maxim of Sunnyvale, California, Phillips Semi-Conductors of Sunnyvale, Calif., and Celeritek of Santa Clara, Calif.

To understand the operation of the invention the following simple algebra is required.

Assume:

| | |
|---|---|
| c = | speed of light |
| f = | frequency of the cell phone |
| d = | 8 cm |
| Δ = | d cos θ cm where Δ is the increase in distance to the furthest antenna |
| t = | Δ/c = d cos θ/c seconds where t is the arrival time difference |

-continued

| | |
|---|---|
| p = | 1/f seconds where p is the period of the cell phone RF signal |
| φ = | 360 t/p = 360 f d cos θ/c gives the phase between the 2 antennas |
| $\cos\theta = \left[\frac{c\phi}{360fd}\right]$ | relates the bearing to the phase difference |

And finally the bearing in degrees to the transmitter is given by:

$$\theta = \arccos\left[\frac{c\phi}{360fd}\right]$$

For an example:

To use round numbers, assume the cell phone is using the frequency of 900 MHz and the locator antennas have a spacing d of 8 cm. If the cell phone is at a bearing angle θ of 45° from the main axis of the locator unit then:

| | |
|---|---|
| Δ = | d cos 45° |
| Δ = | 5.66 cm |
| t = | 0.189 ns |
| p = | 1.11 ns |
| φ (phase delay) = | 61° |

All that the locator unit would "know" are the antenna spacing "d", the frequency "f" of the transmission, the speed of light "c", and the detected phase delay, "φ".

Plugging those numbers into the equation for θ gives:

$$\theta = \arccos\left[\frac{3\cdot 10^8 \text{ cm}/s \cdot 61°}{360° \cdot 900 \text{ MHz} \cdot 8 \text{ cm}}\right] = 45°$$

Other direction finding techniques may be applied to find the bearing angle. Such techniques are taught in many textbooks including "Small-Aperture Radio Direction Finding" by Herndon H. Jenkins published in 1991 by Artech House in Boston and London. This textbook teaches many direction finding techniques including amplitude response, phase differential-to-amplitude response, phase interferometry, and pseudodoppler. This invention encompasses the possible use of these other techniques.

Figure 10:
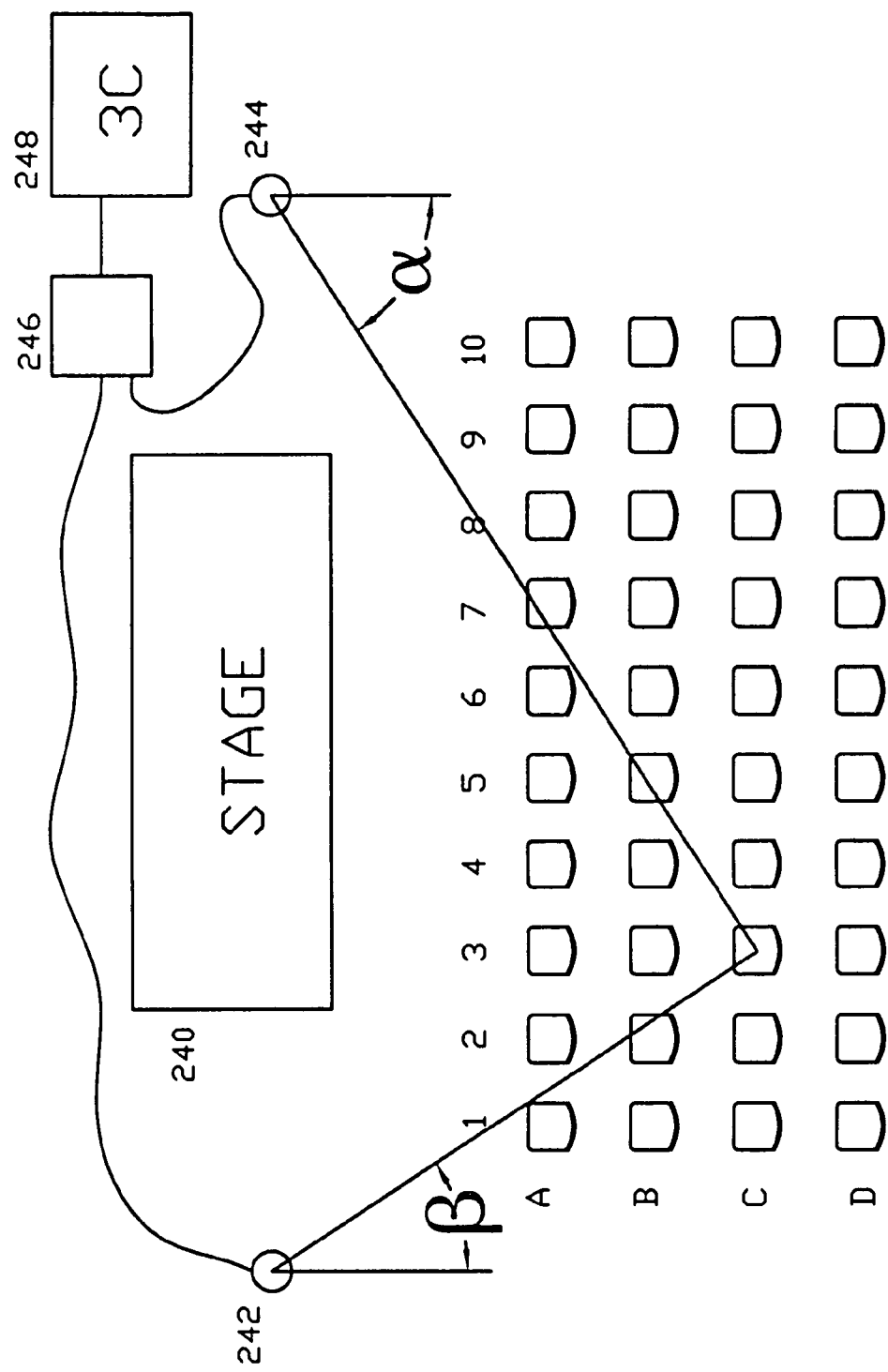
FIG. 10 Shows the use of the bearing angle method in use in a theater.

FIG. 10 shows the use of these locator units to "triangulate" to the offending cell phone. Direction finding units 242 and 244 are located in front of a theatre on each side of the stage 240. Their outputs connect to the controller unit 246 which has the processor to convert the angles-of-origin into an intersection point and the seat location memory to calculate the offending seat position. Display 248 which is readable by the security force shows the seat number. Display 248 is connected to the controller by cable, infrared, or an RF link. Optionally, the display is large and visible to the audience. Someone in seat 3C has their cell phone on, in contravention of the business rules or even of ordinance. Locator 244 sees the cell phone at a bearing of a degrees while locator 242 sees the offender at bearing b degrees. By use of the prestored map of the theatre, the intersection is immediately seen to be seat 3C.

Figure 11:
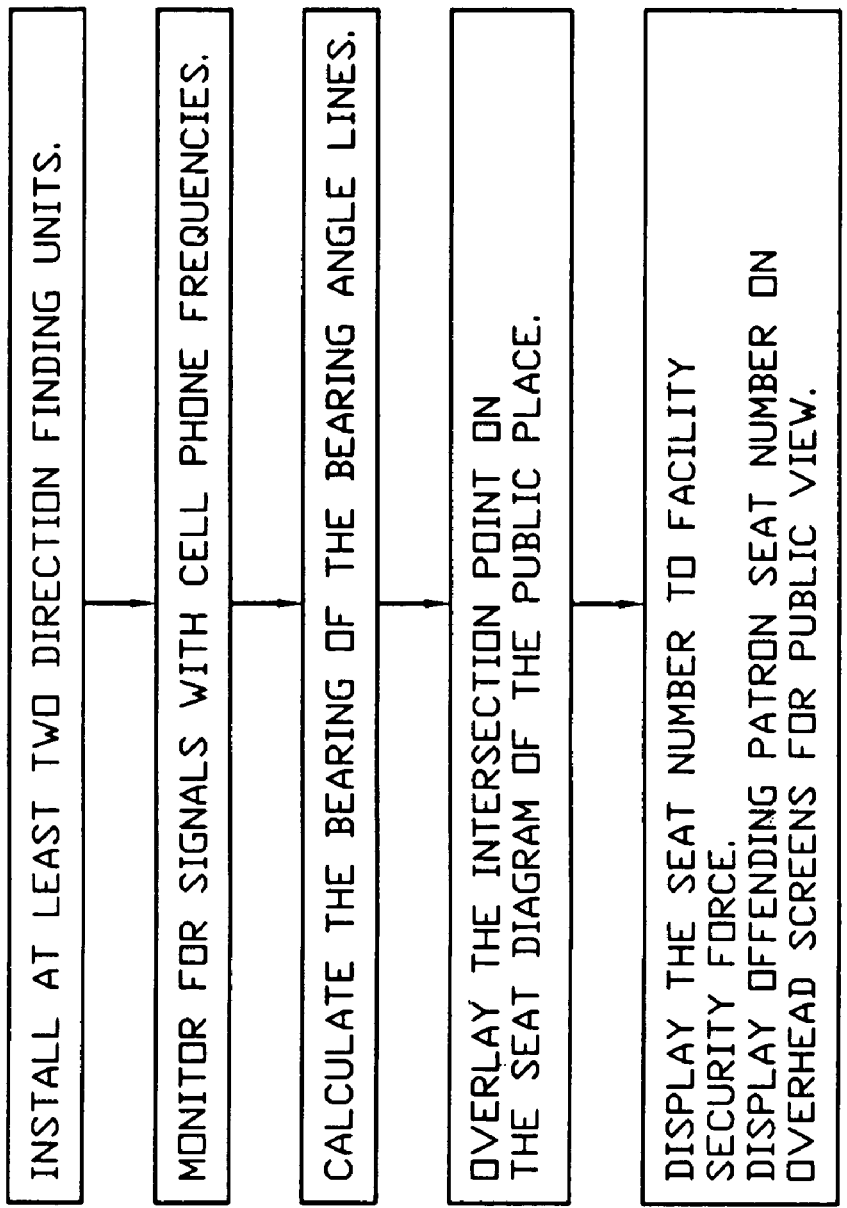
FIG. 11 Shows the steps of the bearing angle method for theater use.

FIG. 11 shows the method of the bearing angle location applied to a theater or other public place. The seat numbering system is overlaid plotted out so that each seat has a precise X-Y coordinate in a local grid. The first step is to install at least two direction finding units. The X-Y locations of these units are also stored for further calculations. Then the system must monitor for signals with cell phone frequencies. It will then calculate the bearing angle (often referred to as the angle-of-origin) from each unit. Lines are then drawn out from the unit along these angles. It will then calculate intersection of these bearing angle (or angle-of-origin) lines. This intersection is then overlayed onto the seat diagram of the public place. The system will then display the seat number to facility security force. It can also, by operator control, display the offending patron seat number on overhead screens for public view.

This system is also adaptable to 3-dimensional seating as is seen in stadiums or theaters of balconies.

I claim :

1. A method of locating nuisance cellular telephones consisting of the steps of:
  a) installing at least two radio frequency direction finding systems inside of a public building;
  b) monitoring for signals with cellular telephone frequencies;
  c) calculating an angle-of-origin to a source of such frequencies; and
  d) calculating the location of the source from the angles-of-origin, wherein the angle-of-origin is determined by phase differential-to-amplitude response.

2. The method of claim 1, wherein step d) includes a seat location for the source.

3. The method of claim 1, wherein the public building is a theater.

4. A system for locating a nuisance cellular telephone in a public place comprising:
  at least two direction finding units;
  a controller operably connected to the at least two direction finding units; and
  a display operably connected to the controller, wherein the controller calculates the location of the nuisance cellular telephone using phase differential-to-amplitude response.

5. The system of claim 4, wherein each of the at least two direction finding units comprises at least two antennas.

6. The system of claim 4, further comprising a memory, wherein the memory stores seat location information.

7. The system of claim 6, wherein the controller comprises the memory.

8. The system of claim 6, wherein the controller calculates a seat number for the source.

9. A method of locating nuisance cellular telephones comprising:
  installing at least two radio frequency direction finding systems inside of a public building;
  monitoring for signals with cellular telephone frequencies;
  calculating an angle-of-origin to a source of such frequencies; and
  calculating the location of the source from the angles-of-origin, wherein the angle-of-origin is determined by phase differential-to-amplitude response.

10. The method of claim 9, wherein calculating the location of the source includes calculating a seat location for the source.

11. The method of claim 9, wherein the public building is a theater.

* * * * *